United States Patent Office 2,758,094
Patented Aug. 7, 1956

2,758,094

TITANIUM ACTIVATED MAGNESIUM BORATE

Peter Whitten Ranby, London, England, assignor to Thorn Electrical Industries Limited, London, England, a British company No Drawing. Application October 12, 1953, Serial No. 385,705

5 Claims. (Cl. 252—301.4)

This invention relates to luminescent materials for use in fluorescent discharge lamps, cathode ray tube screens and X-ray screens and to methods of preparing such materials and an object of the invention is to provide new luminescent materials.

We have discovered that useful luminescent materials can be produced comprising a compound of the elements magnesium, titanium, boron and oxygen.

According to the present invention an artificial luminescent material is provided comprising a magnesium borate activated with titanium, the proportions of the elements magnesium, titanium, boron and oxygen present in the material, expressed as the oxides of the elements magnesium, titanium and boron and by weight of the luminescent material, being from 50 to 85 per cent of magnesium oxide (MgO), from 5 to 40 per cent of titanium dioxide ($TiO_2$), and from 2 to 27 per cent of boric oxide ($B_2O_3$).

Preferably the proportions of the elements magnesium, titanium, boron and oxygen present in the material, expressed as in the immediately preceding paragraph, are from 50 to 70 per cent of magnesium oxide, from 8 to 30 per cent of titanium dioxide, and from 10 to 27 per cent of boric oxide.

Also according to the present invention there is provided a method of preparing an artificial luminescent material comprising a magnesium borate activated with titanium, the method including the steps of preparing an initial mixture in which the proportions of the elements magnesium, titanium, boron and oxygen present, expressed as the oxides of the elements magnesium, titanium and boron and by weight of initial mixture, are from 50 to 85 per cent of magnesium oxide, from 5 to 40 per cent of titanium dioxide, and from 2 to 27 per cent of boric oxide, and thereafter heating the initial mixture at a temperature of 1075° C. or higher to produce the luminescent material.

Preferably the proportions of the elements magnesium, titanium, boron and oxygen present in the said initial mixture, expressed as in the immediately preceding paragraph, are from 50 to 70 per cent of magnesium oxide, from 8 to 30 per cent of titanium dioxide and from 10 to 27 per cent of boric oxide.

It will be noted that the proportions of the elements present in the luminescent material, and in the initial mixture from which the material is prepared, are expressed as the oxides of the three elements magnesium, titanium and boron, even though the said three elements may be present in the material, or the initial mixture, in the form of compounds other than their oxides.

At least part of the magnesium may be present in the initial mixture as the oxide, or as one or more of its compounds which are decomposed readily to the oxide on heating, such as the carbonate, hydroxide, acetate, etc., or it may be present, for example, in combination with titanium in the form of magnesium titanate ($MgTiO_3$), or in combination with boron in the form of magnesium metaborate ($Mg(BO_2)_2$). Similarly, at least part of the boron may be present in the initial mixture as the oxide, or as one or more of its compounds which are decomposed readily to the oxide on heating, or in the form of a magnesium borate compound such as the magnesium metaborate mentioned above.

Preferably the heating is carried out at a temperature between 1125° C. and 1225° C. The materials may be prepared by heating the initial mixture in a closed tube or in various atmospheres such as air, nitrogen or steam, but very strongly reducing atmospheres should not be used, since there is then a tendency for some reduction of the titanium compound to take place.

A luminescent material of the present invention is a magnesium orthoborate ($Mg_3(BO_3)_2$) in which titanium is incorporated as an activator in the form of a suitable compound thereof. The molecular ratio of magnesium oxide to boric oxide in the metaborate is $3MgO:1B_2O_3$, but in order to avoid the formation of the pyroborate ($2MgO:1B_2O_3$), and also to promote crystallisation of the luminescent material, it is necessary to prepare the material with an excess of magnesium oxide present in the initial mixture. The luminescent material can tolerate a comparatively large excess of magnesium oxide before its luminescent efficiency is adversely affected by dilution, and consequently, a comparatively large range of proportions of magnesium oxide, titanium oxide, and boric oxide can be used.

There may be some loss of the boric oxide on heating the initial mixture, owing to volatilisation, and for this reason an excess may be required in the initial mixture.

The materials in accordance with the invention emit a deep blue luminescence when excited by ultra-violet light, for example, of wavelength 2537 A. U. but are not excited by longer wavelength ultra-violet light such as that of 3650 A. U.

During the preparation of the luminescent materials it is sometimes advantageous to add to the initial mixture before the heat treatment a proportion e. g. between 0.2 and 10% by weight, of a material such as magnesium chloride, barium chloride, barium sulphate, sodium sulphate, etc.; such materials appear to assist the reaction of the starting materials.

All the materials used in the preparation of the luminescent materials should be of the high degree of purity which is recognised in the art to be necessary for the preparation of such materials.

Methods of preparing luminescent materials in accordance with the invention will now be described, by way of example. In all the examples the excitation is by ultra-violet light of 2537 A. U. wavelength and all the final products exhibit, when cool, a deep blue fluorescence upon excitation.

*Example 1.*—103 grams of magnesium carbonate (containing 48.6 grams of magnesium oxide), 31 grams of boric acid and 8.9 grams of titanium dioxide are intimately mixed together and then heated for one hour at 1190–1200° C. in an open crucible. When cool the product is ground and reheated for one hour at 1190–1200° C. in an open crucible to give the final product.

*Example 2.*—103 grams of magnesium carbonate (containing 48.6 grams of magnesium oxide), and 31 grams of boric acid are intimately mixed together and then heated for one hour at 1190–1200° C. in an open crucible. When cool the product is ground with 8.9 grams of titanium dioxide and heated for a further hour at 1190–1200° C. in an open crucible to give the final product.

*Example 3.*—41.1 grams of magnesium oxide, 31 grams of boric acid, 8.9 grams of titanium dioxide and 6.9 grams of magnesium chloride hexa-hydrate ($MgCl_2.6H_2O$) are intimately mixed together and then heated in a tightly plugged silica tube for half an hour at 1190–1200° C. to give the final product.

*Example 4.*—48.6 grams of magnesium oxide, 31 grams of boric acid, and 8.9 grams of titanium dioxide are intimately mixed together and then heated for half an hour at 1190° C. in steam to give the final product, which is allowed to cool in steam.

*Example 5.*—The method of Example 4 may be modified by carrying out the heat treatment and the cooling in an atmosphere of nitrogen instead of in steam.

The normal X-ray diffraction pattern characteristic of magnesium orthoborate is modified by the presence of the titanium activator. The characteristic X-ray diffraction lines for the luminescent materials of Examples 1 to 5 are as follows, $d$ being the interplanar spacings in Angstrom units.

| $d$ | intensity | $d$ | intensity |
|---|---|---|---|
| 5.10 | medium. | 1.99 | very weak. |
| 4.20 | Do. | 1.91 | medium. |
| 3.97 | weak. | 1.73 | Do. |
| 3.72 | Do. | 1.67 | Do. |
| 3.47 | medium. | 1.574 | Do. |
| 3.20 | weak. | 1.553 | weak. |
| 3.07 | medium. | 1.535 | Do. |
| 2.67 | strong. | 1.510 | Do. |
| 2.56 | Do. | 1.471 | Do. |
| 2.52 | Do. | 1.402 | Do. |
| 2.32 | medium. | 1.381 | Do. |
| 2.23 | Do. | 1.361 | Do. |
| 2.17 | strong. | 1.294 | Do. |
| 2.04 | medium. | 1.155 | Do. |

I claim:

1. An artificial luminescent material comprising a magnesium borate activated with titanium, wherein the material is the reaction product, fired at a temperature of at least 1075° C., of a mixture in which the proportions of the elements magnesium, titanium, boron and oxygen present in the material, expressed as the oxides of the elements magnesium, titanium and boron and by weight of the luminescent material, are from 50 to 85 per cent of magnesium oxide, from 5 to 40 per cent of titanium dioxide, and from 2 to 27 per cent of boric oxide.

2. An artificial luminescent material as claimed in claim 1, wherein the proportions of the elements magnesium, titanium, boron and oxygen present in the material, expressed as the oxides of the elements magnesium, titanium and boron and by weight of the luminescent material, are from 50 to 70 per cent of magnesium oxide, from 8 to 30 per cent of titanium dioxide, and from 10 to 27 per cent of boric oxide.

3. A method of preparing an artificial luminescent material comprising a magnesium borate activated with titanium, the method including the steps of preparing an initial mixture in which the proportions of the elements magnesium, titanium, boron and oxygen present, expressed as the oxides of the elements magnesium, titanium and boron and by weight of initial mixture, are from 50 to 85 per cent of magnesium oxide, from 5 to 40 per cent of titanium dioxide, and from 2 to 27 per cent of boric oxide, and thereafter heating the initial mixture at a temperature of at least 1075° C. to produce the luminescent material.

4. A method as claimed in claim 3, wherein the proportions of the elements magnesium, titanium, boron and oxygen present in the initial mixture, expressed as the oxides of the elements magnesium, titanium and boron and by weight of the initial mixture, are from 50 to 70 per cent of magnesium oxide from 8 to 30 per cent of titanium dioxide and from 10 to 27 per cent of boric oxide.

5. A method as claimed in claim 3, wherein the initial mixture includes between about 0.2 and 10% by weight of a compound selected from the group consisting of magnesium chloride, barium chloride, barium sulphate and sodium sulphate.

References Cited in the file of this patent

UNITED STATES PATENTS 2,270,124     Huniger _____ Jan. 13, 1942

OTHER REFERENCES

Kroger: Some Aspects of the Luminescence of Solids, 1948; Elsevier Publishing Co., New York, pp. 158–159.